United States Patent
Oglesbee et al.

(10) Patent No.: US 6,268,715 B1
(45) Date of Patent: Jul. 31, 2001

(54) VOLTAGE PROFILE CHARGE CONTROL SYSTEM

(75) Inventors: John Wendell Oglesbee, Watkinsville; Martin Hague Ramsden, Lawrenceville; John Edward Herrmann, Dacula, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/562,267

(22) Filed: Apr. 29, 2000

(51) Int. Cl.$^7$ .................................................. H01M 10/46
(52) U.S. Cl. .................................................. 320/156
(58) Field of Search .................................. 320/127, 128, 320/133, 148, 156, 157, 158, 159, 161, 162, 163, 164

(56) References Cited

U.S. PATENT DOCUMENTS

| | | |
|---|---|---|
| 4,388,582 * | 6/1983 | Saar et al. . |
| 4,843,299 | 6/1989 | Hutchings . |
| 4,947,124 | 8/1990 | Hauser . |
| 5,049,803 | 9/1991 | Palanisamy . |
| 5,367,244 * | 11/1994 | Rose et al. . |
| 5,541,492 * | 7/1996 | Fernandez et al. . |
| 5,617,006 * | 4/1997 | Lenhart et al. . |
| 5,623,197 * | 4/1997 | Roseman et al. . |

FOREIGN PATENT DOCUMENTS

0704954 A3    1/1996    (EP) .

* cited by examiner

Primary Examiner—Edward H. Tso
(74) Attorney, Agent, or Firm—Philip H. Burrus, IV

(57) ABSTRACT

This invention is a battery charging system that charges rechargeable battery cells by tracking a voltage profile charging curve across time. As all lithium based, like voltage cells have the same voltage profile across time, regardless of capacity, the invention presents a preferred embodiment of a universal charger capable of charging lithium batteries of varying capacities. Current is treated as a variable dependent upon voltage. Thus, in a preferred embodiment, cells of varying capacities will be charged at an optimal rate, thereby optimizing battery performance. One embodiment uses frequency selection to vary the rate of change in the output voltage of the system, thereby tracking the voltage profile charging curve across time.

14 Claims, 2 Drawing Sheets

VOLTAGE PROFILE CHARGE CONTROL SYSTEM

TECHNICAL FIELD

This invention relates generally to battery chargers, and more specifically to a charger for Lithium-Ion, Lithium-Polymer, and other types of rechargeable batteries.

BACKGROUND

Traditionally lithium rechargeable cells are first charged at constant current until a critical voltage is reached (the termination voltage) and then are charged at constant voltage until the charging current tapers to some minimal value, at which point charging is terminated. Typical current and voltage profiles of this charging method are shown in FIG. 1, and are known in the art. For example, with a 1000 mA*hr cell the initial charge current would be typically 1000 mA (known as a "1 Capacity" or "1C") rate and the charge method would transition to constant voltage when 4.2 volts was reached at the cell terminals. Charging would be terminated when the current tapered down to 25 mA typically. This is the type charging method recommended by most lithium ion cell manufacturers, and is widely used for recharging lithium cells.

A disadvantage of this type of charging system is that during the constant current charging portion of the charge cycle, the current should be set at a 1C rate. A 1C rate is used because it optimizes battery performance by maximizing the number of times that the battery can be recharged without losing capacity. This 1C requirement presents a problem, however, in that any one particular charger is designed to optimally charge only one particular battery. A standard cellular phone, for example, may have both a normal battery and an extended life battery. The standard battery might be a 500 mA*hr hour battery, while the extended life battery is a 1000 mA*hr battery. If the engineers design a charger to optimally charge the normal battery, the charger will source 500 mA. If a user inserts the extended life battery, a 500 mA charge current will not optimally charge the battery. Thus, to optimally charge both batteries, the user would need two different chargers! This is both expensive and cumbersome.

One prior art method used to avoid this problem is a charger design that is capable of "adjusting charge rates". In other words, charger is designed to change the charge current level depending upon the battery being charged. To accomplish this, the charger must first be able to identify what kind of cell is being charged. One way to do this is by including a "code resistor" in the battery. The charger reads the value of the code resistor and adjusts the current accordingly. For example, a 10 k resistor might correspond to a 1000 mA charge current. The problem with this method of identification is that it requires both an additional component—the resistor—and at least one additional battery terminal.

Another method of battery identification is the use of a programmable memory device. If a memory device is built into the battery, that device can store identifying information like capacity, charge current, number of charge cycles, etc. Again, this solution is very expensive and requires at least one additional battery terminal.

There is thus a need for an improved universal battery charger.

DETAILED DESCRIPTION OF THE INVENTION

Voltage Profile Charging

Figure 1:
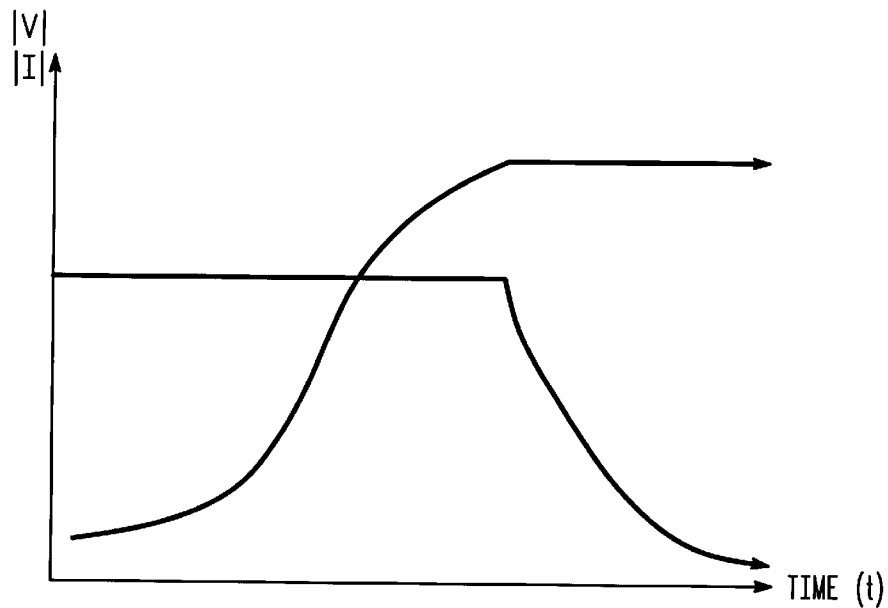
FIG. 1 illustrates the voltage and current profiles for a lithium based rechargeable battery.

It is well known that the dominant electrical and chemical processes of a rechargeable battery cell can be approximately described mathematically by a multi-order differential equation. (For example, the article "Modeling of Galvanostatic Charge and Discharge of the Lithium/Polymer/Insertion Cell" by Marc Doyle, Thomas F. Fuller and John Newman, Journal of the Electrochemical Society, Vol. 140, No. 6. June, 1993, describes one such approximate mathematical solution.) Such a multi-order differential equation mathematically relates the electrical parameters of the cell at the cell terminals (such as voltage and current during the charging process) as a function of time, for specific initial conditions. Such an equation may be structured to contain only three significant mathematical variables: voltage, current, and time. Although such an equation may describe a very complex mathematical relationship, the general nature of such an equation is to contain only one independent electrical variable, such as voltage, and one dependent electrical variable, such as current. Alternatively, the same equation may be reformulated mathematically to relate current as the independent variable, and voltage as the dependent variable.

In other words, if the voltage to the terminals of a rechargeable cell is defined as a function of time, then the current at the terminals becomes a dependent variable (dependent upon voltage and time) defined by the applied voltage, the cell characteristics as related by a multi-order differential equation, and other related circuit parameters. Conversely, if the current to the terminals is defined as a function of time, then the voltage at the terminals becomes a dependent variable defined by the applied current, the cell characteristics as related by a multi-order differential equation, and other related circuit parameters. Thus, the response of the rechargeable battery cell for either current or voltage may be completely defined by specifying only one independent electrical variable, which may be either voltage or current, and time.

As a further illustration of this mathematical duality, the traditional charging method described herein above treats current as the independent variable during the traditional constant current portion of the charging cycle, and voltage as the independent variable during the traditional constant voltage portion of the charging cycle. Thus, a constant current is initially applied to the cells an independent variable, and the resultant voltage becomes the dependent variable. Later, a constant voltage is applied to the cell as an independent variable, and the resultant current becomes the dependent variable. In this traditional prior art approach, the transition between these variables occurs when the termination voltage of the cell is first reached. However, this traditional prior art method is illustrative of only one possibility for defining the dependent and independent variables during the charging process. This invention, for example, is based on the charging process be defined entirely by always using voltage as the independent variable, and the resultant current then always becomes the dependent variable. This particular method of controlling the charging variables has certain significant advantages for some applications, as will be described further below.

As is well established in the prior art charging systems, a 1C constant current is applied to a lithium-ion cell, causing the current to become the independent variable for at least the first part of the charging cycle. This constant current as a function of time, along the multi-order differential equation describing the chemical and electrical properties of the cell, thus generates the well-known, dependent voltage response illustrated in FIG. 2. A significant observation has been demonstrated that for all typical lithium-ion cells, this dependent voltage response is substantially independent of battery shape, size, brand and style. This dependent voltage response curve is defined herein as the "Lithium-Voltage-Profile", or LVP 309. While the curve described herein is being directed in particular to rechargeable lithium battery cells, in this invention the curve could be any monotonically increasing curve.

The object of this invention is to utilize the consistent LVP associated with all lithium cells to create a charging system that does not require any means of battery identification to optimally charge batteries of varying capacities. This alternative charging method shall be referred to as "voltage profile charging."

In voltage profile charging, the rate at which energy is delivered to the cell is controlled by applying a predetermined independent voltage variable across the cell terminals. The magnitude of the instantaneous cell charging voltage is controlled as a function of time, such that the voltage at any point in time substantially matches the voltage across the cell that would have been obtained using a conventional and traditional prior art charging method. In other words, the voltage applied to the cell mirrors and tracks the LVP across time.

The present invention includes a voltage regulator that is designed to generate and track the LVP. Voltage is the independent electrical variable during the entire charging process. The dependent variable, current, is allowed to "free-wheel" as the voltage follows the LVP across time. By "free wheel" it is meant that the current is defined by the applied LVP voltage, the multi-order differential equation relating the cell's electrical and chemical response, and time. The result is a charging method that intrinsically adjusts to charge at an optimal rate regardless of the size or capacity of the cell being charged.

Such a charger is best illustrated by an example: Note that we have suggested that a 1000 mA*hr battery produces the same LVP when charged at 1000 mA as does a 500 mA battery being charged at 500 mA. If the voltage regulator of a charger is designed to track that one, single, unifying LVP, then the cell charging response (as defined by the multi-order differential equation relating the cell's electrical and chemical processes with time) will be optimally perfect for any particular cell capacity that is being charged. In other words, when the 500 mA*hr battery is inserted into the charger, and the unifying LVP curve is applied, the cell will be optimally charged as for a 500 mA*hr capacity. Likewise, when the 1000 mA*hr battery is inserted into the charger, and the unifying LVP curve is applied, the cell will be optimally charged as for a 1000 mA*hr capacity. Thus, by controlling voltage as an independent electrical variable, in conjunction with designing a voltage regulator that tracks the LVP across time, a battery charger can be designed that charges batteries of varying capacities at an optimal rate without identification of the cell capacity.

From the preceding discussion, it is clear that the LVP charging method substantially matches the cell charging energy transfer characteristics obtained from conventional traditional charging methods widely practiced in the art. This occurs because the cell responds identically for either method of charging, with substantially the same current and voltage response over time. Thus, energy delivery to the cell can be controlled in the conventional, traditional manner, or it can be controlled by imposing an appropriate LVP on the cell. The cell has no way of knowing which charging control method is being used, because the current and voltage at the cell terminals are substantially identical over time for either method.

Capacity Independent Charging

One of the significant advantages of voltage profile charging is that the rate of charge becomes completely independent of the capacity of the cell. As previously stated, the voltage profile for a 500 mA*hr cell is exactly the same as the voltage profile of a 1000 mA*hr cell. Therefore, the same voltage charging profile can be used for either cell, and the necessity of identifying the cell capacity to the charging system for optimal charging is eliminated. This reduces the amount of hardware and cost of the charging system.

To better understand why the LVP curves of batteries of varying capacities are identical, use the following thought experiment: Visualize a 1000 mA*hr cell structurally as a parallel combination of two 500 mA*hr cells. A voltage profile appropriate for one 500 mA*hr cell can be used identically for two 500 mA*hr cells in parallel, because the same voltage profile is applied simultaneously to both cells when they are connected in parallel. The charging current at any instant of time divides equally between the two parallel cells because of circuit symmetry. Therefore the LVP is identical for parallel cells as for a single cell; however the current drawn by two parallel cells is twice that of a single cell. This argument can be extended to any number of cell capacity combinations in parallel. Therefore the rate of charging is completely independent of the number or capacity of cells in a parallel combination. Since a large capacity cell is electrically and structurally identical to a number of smaller cells operated in parallel, it follows logically that the charge rate using voltage controlled charging is independent of the actual cell capacity.

Load Independent Charging

A second significant advantage of voltage profile charging control is that the charging rate for a cell is independent of whether a load device is also connected to the charging system. Therefore it is possible to both charge a cell and provide power to a load device using the same power supply and voltage profile charging system. This occurs because the charging rate using voltage profile charging depends only on the instantaneous voltage across the cell, and this voltage is independent of whether a load current is also being supplied or not. If a load device is connected in parallel with the cell, the same LVP is impressed on both the load device and the cell itself. The amount of current drawn by the cell depends only on its instantaneous LVP, and is not influenced at all by any load current drawn by a load device. Therefore the charging system can be connected to supply current to both a load and a cell to be charged without influencing in any way the rate of energy transfer to the cell. As long as the charging system has capability to maintain the desired instantaneous LVP across both the cell and the load, then the charging of the cell proceeds completely independently of any current drawn by the load. In such a parallel system, only the voltage profile determines the charge rate, and therefore the charging process is not changed by any additional load current.

A Preferred Embodiment of the Invention

Figure 3:
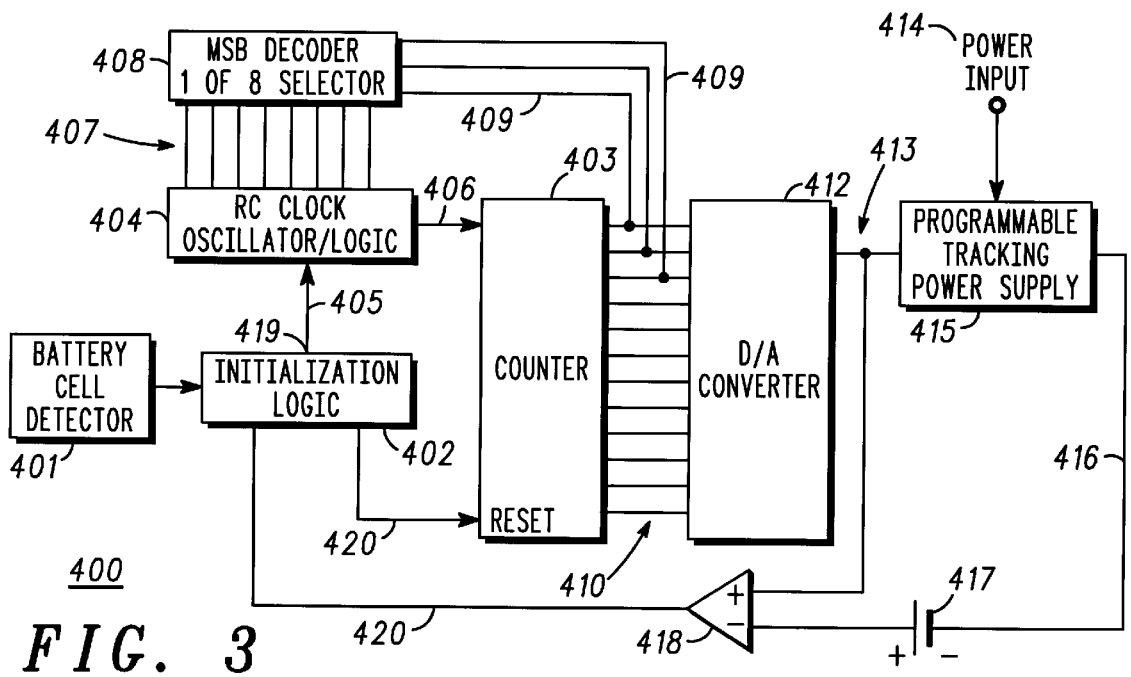
FIG. 3 is a schematic diagram of a preferred embodiment of the invention.

Referring now to FIG. 3, a preferred embodiment of a schematic diagram of a charger using voltage profile charge control methods is shown. All components 401–419 are electrically coupled in a traditional manner. A preferred method of coupling is by soldering the components to a printed wiring board, as known in the art.

The system 400 remains in an idle state until a battery, or equivalent device, including a phone with a battery cell connected, is inserted into the charger. Upon insertion, the battery cell detector 401 momentarily toggles its output state. The initialization logic 402 then becomes activate and does several things: First it activates a fast clock control terminal 419 which is coupled to the RC clock oscillator 404 through a current limiting resistor 405. Concurrently, the initialization logic 402 toggles a reset line 420 that acts to reset a n-bit counter (note: for exemplary purposes, this embodiment uses 12-bit counter).

The fast clock control signal causes the RC oscillator 404 to output a fast clock signal on the clock signal line 406. The term "fast clock" is intended to refer to a clock that operates in the kilohertz range. The fast clock signal present on the clock signal line 406 causes the counter 403 to begin counting at a rapid rate. As the counter output bits 410 are coupled to a digital-to-analog converter 412 (known as a "D/A converter"), the D/A output voltage 413 begins to increase in correspondence to the advancing counter.

The D/A output voltage 413 serves as a reference to a tracking power supply 415. The term "tracking power supply" is used to mean a power supply that has an output voltage proportional to a control voltage. A common example well known in the art is a circuit coupled to an energy source comprising power conversion means and closed loop voltage regulating means, such that the instantaneous output voltage of the supply is constantly regulated to accurately track the analog input control variable. This tracking is achieved essentially independent of all variables of the power conversion process, including in particular variations in input line voltage and output load current. The D/A output voltage 413 serves as the control reference, while primary power is supplied by and electrically coupled power input 414. For this embodiment, the scaling factor between reference and output is 1. Thus, the output of the tracking power supply 416 should exactly match the D/A output voltage 413.

Now, when the battery cell (not shown) is coupled to the output of the tracking power supply 416, the voltage at that point 416 is initially set by the cell. As the counter was initially reset to zero, the D/A output voltage 413 begins initially below the voltage of the cell. (Note that this assumes that the power supply has a diode like function causing it to operate only in the first quadrant.) This causes the comparator 418 to have an output 420 in an active low state. The counter 403, however, is counting rapidly. As the counter increases, so does the D/A output voltage 413. As soon as the D/A output voltage 413 reaches (or just exceeds) the level of the output of the tracking power supply 416, the comparator output 420 is driven into an active high state, causing the counter to momentarily cease accumulating. The system 400 has now located the counter state to allow its output 416 equal to the initial battery cell voltage. (For this example, this point corresponds to point 301 in FIG. 2.)

When the comparator output 420 goes high, this disables the fast clock control signal 419. With the fast clock control signal 419 disabled, the logic in the RC oscillator 404 causes the oscillator 404 to look to the frequency setting resistors 407. As shown, the decoder 408 drives these frequency-setting resistors. The decoder 408 is driven by the most significant bits 407, or "MSBs", of the counter. With this configuration, the decoder 408 selects one of eight different clock frequencies as determined by the MSBs 409. The frequency chosen corresponds to the slope of any one individual line segment approximating the voltage profile charge curve in FIG. 2. (It is clear that while this embodiment utilizes an 8 segment piecewise linear approximation, a different number of segments would work equally well.)

Figure 2:
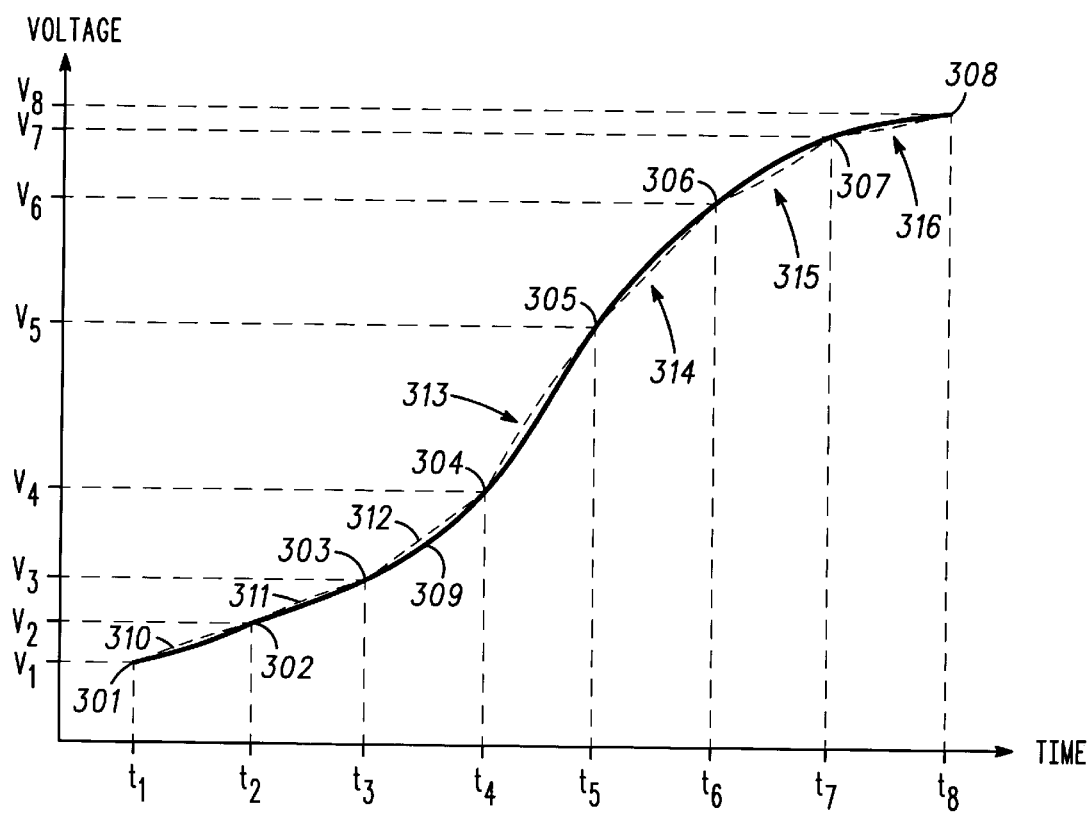
FIG. 2 is a voltage profile charging curve.

Back to the example, if we are at point 301 in FIG. 2, assuming that the MSBs 409 are "000", a first resistor from the frequency resistors 407 is selected. This resistor causes the counter to count such that the D/A output voltage 413 increases per the slope of line segment 310. As soon as the first MSB 409 changes, a second resistor is selected which corresponds to the slope of line segment 311. As this process continues, eight different frequency resistors are selected corresponding to eight different slopes. The result is a charging system that approximates the voltage charging profile 309 through piecewise linear approximation.

One further note regarding this embodiment, it is sometimes necessary to set the D/A output voltage 413 slightly above the tracking power supply output voltage. This may be due to parasitic resistance in a cable or protection circuitry. In any event, this is easily achieved by inserting an offset voltage 417 between the tracking power supply output 416 and the comparator 417.

It may be desirable to monitor the charge current during the LVP charging process. If the charge current is not within reasonable bounds, then the starting point on the LVP charging curve may be adjusted either up or down to accomplish a more reasonable charge current. For example, if the charge current is very excessive (greater than a 2C rate, for instance), this is an indication that the starting point on the LVP charging curve is not properly synchronized with the initial battery state of charge. This is easily corrected by either stopping charging for a period of time (one minute, for instance), or by slowing down the rate of change of instantaneous voltage per unit time across the voltage profile charging curve.

Also, the charge process may be interrupted periodically, and the open circuit cell voltage may be measured to determine if it corresponds to the voltage profile charging curve. For example, every five minutes, the charge process might be interrupted for 15 seconds. During these 15 seconds the open circuit voltage of the cell may be measured and compared to the instantaneous voltage on the voltage profile charging curve. If the voltages are comparable, the charger knows that the voltage profile charging curve and battery have been synchronized properly in time. (Note that this is a controlled synchronization in the time domain, as opposed to constant parameter measurement.) If the cell voltage is much less than the instantaneous voltage on the voltage profile charging curve, the charger knows that the rate of change in voltage per unit time across the voltage profile charging curve needs to be reduced to obtain better time synchronization. If the cell voltage is much greater than the instantaneous voltage on the voltage profile charging curve, the charger knows that the rate of change in voltage per unit time across the voltage profile charging curve needs to be increase. The advantage of this approach is that in the event that the system becomes "lost", possibly due to error from a transient event, the system will recover and properly synchronize the instantaneous voltage in time on the voltage profile charging curve to the battery cell.

Note that in the preferred embodiment above, no memory device, i.e. no Read Only Memory (ROM), Programmable Read Only Memory (PROM), Electrically Erasable Programmable Read Only Memory (EEPROM), or equivalent, is necessary. It is not necessary to measure an "empirical lithium curve" and then store voltage points across time in a memory device. The circuit above instead generates a suitable LVP curve using hardware circuitry. Also, measuring current as described is not fundamental to the process. It merely provides a backup method of synchronizing time in the unlikely event of an error or transient event.

While the embodiment above recites a circuit generating a single LVP charging curve, it will be obvious to one skilled in the art that multiple (similar or different)curves could be generated. For example, while the curves for various lithium batteries are substantially similar, it may be desirable to terminate charging at different points. A person who "lightly discharges" their battery may get better performance from a charge cycle that terminates at a lower voltage. Thus, it is contemplated that a "heavy charge", terminating at a voltage of 4.2 volts, and a "light charge" terminating at 4.0 volts could reside within the same circuit. One example of a simple embodiment to achieve multiple voltage profile charging curves is through redundancy. By adding a select switch that chooses between parallel clock modulators, multiple curves could be generated.

Additionally, while the embodiment described comprises an RC oscillator, it will be obvious to one skilled in the art that numerous other clock modulating devices could be used. For example, a popular way to modulate clock signals is via an Application Specific Integrated Circuit (ASIC). In ASIC designs, it is well known that clock modulating circuits may be constructed using voltage controlled clock modulation, current controlled clock modulation, or resistive controlled clock modulation. Voltage or current controlled modulation lends itself to common ASIC manufacturing techniques because transistors with different characteristics may be employed as opposed to the frequency setting resistors described above.

One more thing is important to note: the embodiment described above operates in an open loop configuration in relation to the battery. This means that the circuit generates a voltage profile charging curve with no battery feedback. The system also needs no repeated initialization. While this is a preferred embodiment, the invention is not so limited. Existing battery charging systems typically have at least one battery feedback signal which runs through the cable to the charger. If a voltage profile charging system were inclined to take advantage of this signal, a feedback mode could be utilized to provide a security check that the battery was actually being charged as desired.

An Alternate Embodiment of the Invention

Figure 4:
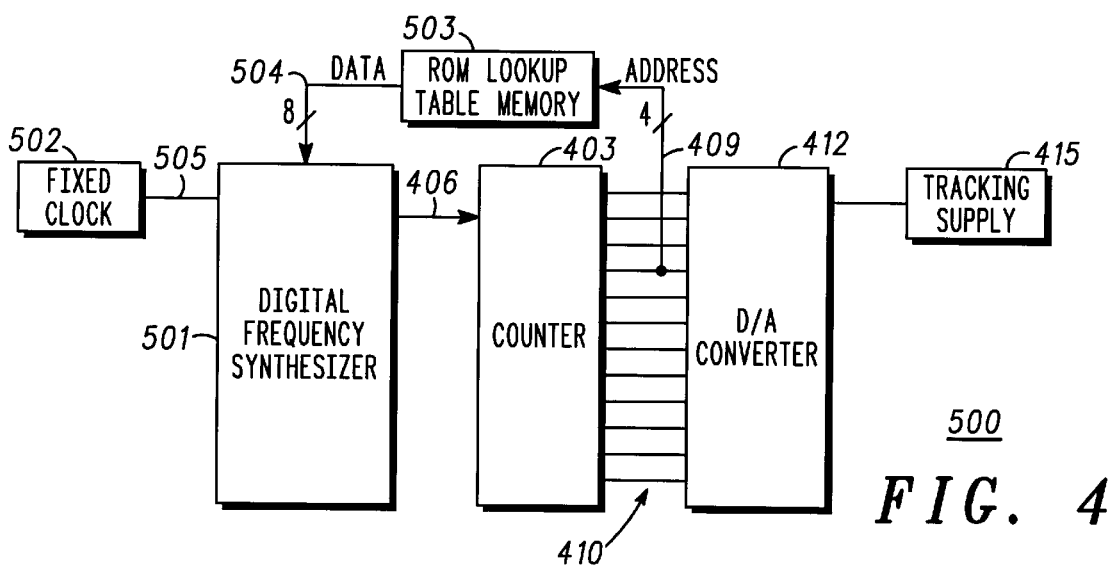
FIG. 4 is a schematic diagram of an alternate embodiment of the invention.

One alternate embodiment utilizes digital technology as opposed to analog. Referring now to FIG. 4, illustrated therein is a system 500 for charging batteries along a voltage profile charging curve. The tracking power supply 415, D/A 412 and counter 403 all work in the same fashion as in FIG. 3.

The difference in this embodiment is in the frequency determination. In FIG. 3, frequency setting resistors (or similar devices) were used to set the frequency of an variable frequency oscillator. In FIG. 4, however, the frequency selection is performed digitally using frequency synthesis techniques and selection logic, which determines an appropriate frequency. The MSBs 409 are coupled to a look-up table 503 burned into a Read Only Memory ("ROM"). The MSBs 409 act as select lines that point to address in the look-up table 503. Each address in the look-up table 503 is an 8-bit word. When the MSBs 409 point to a particular address, the word in the look-up table 503 is written to a data bus 504, which is electronically coupled to a digital frequency synthesizer 501. The digital frequency synthesizer 501 then modulates a clock input 505 from a fixed oscillator 502. By writing different words into the different addresses, the system approximates the voltage profile charging curve.

Alternatively, the embodiment above need not include a memory device. For example, the selection outputs could be directly coupled to the frequency synthesizer, and the synthesizer could be appropriately designed and configured to generate the desired counter clock frequencies corresponding to each of the selected outputs that are activated. In this manner the selection outputs could directly select from a plurality of frequencies.

Figure 5:
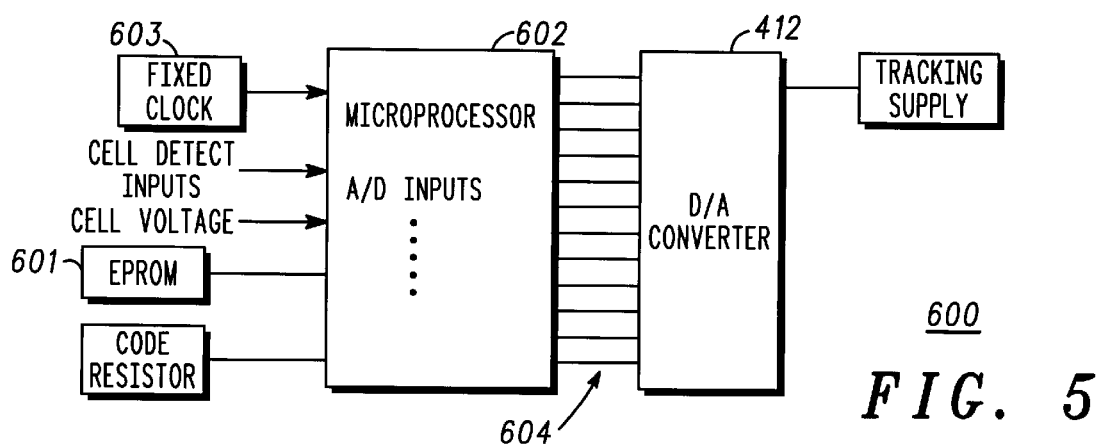
FIG. 5 is a schematic diagram of an alternate embodiment of the invention.

Referring now to FIG. 5, a further alternate embodiment is illustrated. In this embodiment, a computer program is stored in an Electrically Programmable Read Only Memory 601 ("EPROM"). The EPROM 301 is coupled to a microprocessor 602 which runs off of a fixed clock 603. As common microprocessors include real time clocks, the microprocessor 602 simple increments data lines 604 at different rates across time. In this fashion, the system 600 is able to approximate the voltage profile charging curve.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, the system could also be implemented with a programmable logic device.

What is claim is:

1. A battery charging system comprising:
   A) a power source;
   B) means for modulating the power input electrically coupled to the power source;
   C) logic means for modulating clock signals electrically coupled to the means for modulating the power input; and
   D) terminals for connecting to a rechargeable battery cell, the terminals being electrically coupled to the means for modulating the power input;
   wherein the logic circuitry causes the means for modulating the power input to track at least one monotonically increasing voltage curve across time to charge the rechargeable battery cell.

2. The system of claim 1, wherein the monotonically increasing curve is a voltage profile charging curve.

3. The system of claim 2, wherein the logic means for modulating clock signals comprises:
   A) a cell detector;
   B) initialization logic electrically coupled to the cell detector;
   C) oscillator logic electrically coupled to the initialization logic; and D) means for converting digital signals to analog signals, electrically coupled to the oscillator logic, having at least one digital input and at least one analog output;

wherein the oscillator logic selects from at least one frequency corresponding to at least one rate of charging.

4. The system of claim 3, wherein the battery cell detector comprises logic for actuating a start control signal that initializes the system.

5. The system of claim 4, wherein the oscillator logic comprises:
   A) a resistor-capacitor oscillator having at least one frequency control input;
   B) digital logic for processing the at least one frequency control input;
   C) a counter having at least one digital count output; and
   D) a decoder having at least one select control input at least one frequency control output, the decoder being capable of selecting at least one frequency control output based upon the at least one count output.

6. The system of claim 5, wherein the output of the means for converting digital signals to analog signals sets the output voltage level of the means for modulating the power input.

7. The system of claim 6, wherein the system further comprises a means for comparing the output of the means for converting digital signals to analog signals and the output of the means for modulating the power input, such that when the output of the means for modulating the power input exceeds the output of the means for converting digital signals to analog signals, a comparison control signal is asserted.

8. The system of claim 7, wherein the system further comprises an initialization offset voltage.

9. The system of claim 8, wherein when the rechargeable battery cell is coupled to the means for modulating the power input, the system increases the output of the means for modulating the power input until it reaches a predetermined point, and thereafter the means for modulating the power input tracks the voltage profile charging curve across time.

10. The system of claim 4, wherein the oscillator logic comprises:
   A) a digital frequency oscillator having at least one frequency control input;
   B) a fixed clock electrically coupled to the digital frequency oscillator; and
   C) a counter having at least one digital count output.

11. The system of claim 10, wherein the oscillator further comprises a memory having stored therein at least one digital bit corresponding to at least one synthesizer frequency.

12. The system of claim 4, wherein the oscillator logic comprises:
   A) a microprocessor having at least one data control input;
   B) a digital clock electrically coupled to the microprocessor; and
   C) a memory having stored therein at least one digital bit corresponding to at least one synthesizer frequency.

13. The system of claim 4, wherein the oscillator logic comprises:
   A) voltage controlled clock modulation; and
   B) logic circuitry electrically coupled to the voltage controlled clock modulation;

wherein the logic circuitry and voltage controlled clock modulation comprise at least one semiconductor die.

14. The system of claim 4, wherein the oscillator logic comprises:
   A) current controlled clock modulation; and
   B) logic circuitry electrically coupled to the current controlled clock modulation;

wherein the logic circuitry and current controlled clock modulation comprise at least one semiconductor die.

* * * * *